(12) United States Patent
Gray

(10) Patent No.: US 7,125,830 B2
(45) Date of Patent: Oct. 24, 2006

(54) COOLANT TREATMENT FORMULATION

(75) Inventor: Buddy Don Gray, Dellrose, TN (US)

(73) Assignee: Water Solutionz International, Inc., Northbrook, IL (US)

( * ) Notice: Subject to any disclaimer, the term of this patent is extended or adjusted under 35 U.S.C. 154(b) by 0 days.

(21) Appl. No.: 10/494,802

(22) PCT Filed: Nov. 6, 2002

(86) PCT No.: PCT/US02/35530

§ 371 (c)(1),
(2), (4) Date: Sep. 17, 2004

(87) PCT Pub. No.: WO03/040046

PCT Pub. Date: May 15, 2003

(65) Prior Publication Data

US 2005/0040363 A1   Feb. 24, 2005

Related U.S. Application Data

(60) Provisional application No. 60/338,530, filed on Nov. 6, 2001.

(51) Int. Cl.
*C02F 5/02* (2006.01)
(52) U.S. Cl. .................. 510/247; 252/175; 252/181
(58) Field of Classification Search ............... None
See application file for complete search history.

(56) References Cited

U.S. PATENT DOCUMENTS

| | | | |
|---|---|---|---|
| 3,948,792 A * | 4/1976 | Watsen et al. ............... 252/181 |
| 4,442,009 A | 4/1984 | O'Leary et al. ............. 210/697 |
| 4,741,862 A * | 5/1988 | Kosal ........................ 510/245 |
| 5,221,495 A * | 6/1993 | Cao ........................... 510/321 |
| 5,232,622 A | 8/1993 | Jones et al. ............ 252/174.24 |
| 5,338,528 A | 8/1994 | Sörensson et al. .......... 423/333 |
| 5,510,038 A | 4/1996 | Wegmüller ................. 210/698 |
| 5,575,946 A | 11/1996 | Beck et al. ................. 252/181 |
| 5,589,138 A * | 12/1996 | Drechsler ................... 422/108 |
| 5,942,207 A * | 8/1999 | Moini et al. ................ 423/700 |

* cited by examiner

*Primary Examiner*—Gregory Webb
(74) *Attorney, Agent, or Firm*—Seed IP Law Group PLLC

(57) ABSTRACT

A chemical formulation for treating coolant deficiencies, such as corrosion, scale, and low thermal transfer, and treating the root of most of the problems, which is water composition, and providing for preventative measures that further protect the systems that utilize the coolant. The formulation utilizes multiple ingredients, including an adsorbent, an emulsifier, a buffering agent, a dispersant, a deflocculate, a chelation agent, and a peptizing agent, each of which are chosen for a specific task and for the characteristics of having little or no impact on the environment, and for being either a food type additive, approved for use on food preparation surfaces, or otherwise generally recognized as safe. The ingredients, besides having their own specific task, when compounded with each other in the formulation or those elements found in the system being treated, also provide synergistic effects. All of these elements work together to produce a coolant treatment formulation that is safe to use, that is environmentally compatible, that is effective in both cleaning and protecting the treated system.

31 Claims, 1 Drawing Sheet

| 8.20 pH Buffering Formulation Table ||
|---|---|
| Ingredient | Percent |
| Sodium Silicate | 3.8 |
| EDTA | 11.6 |
| Zeolite | 36.3 |
| STPP | 1.4 |
| Sodium Citrate | 46.9 |

Figure 1

| Preferred Embodiment for HVAC Systems ||
|---|---|
| Active Ingredient | Amount |
| $SiO_2$ (as 57.2% $SiO_2$ and 23.8% $Na_2O$) | 40 mg/liter |
| EDTA (as 81% $Na_4EDTA$) | 171 mg/liter |
| Zeolite (type Na-A) | 660 mg/liter |
| P (as $Na_5P_3O_{10}$) | 6.25 mg/liter |
| Citrate (as $C_6H_5Na_3O_7$) | 865 mg/liter |
| Didecyl Dimethyl Ammonium Chloride (80%) | 26.7 mg/liter |

Figure 2

COOLANT TREATMENT FORMULATION

BACKGROUND OF THE INVENTION

1. Field of the Invention

The disclosed embodiments of the invention relate generally to a chemical formulation, and more specifically, to a coolant treatment formulation that not only treats the problems associated with coolant deficiencies, such as corrosion, scale, and low thermal transfer, but also addresses the root of most of the problems, which is the composition of the water itself.

2. Description of the Related Art

Typically, prior coolant treatment and cleaning formulations have used harsh, toxic, and environmentally incompatible chemicals such as strong acids and bases, heavy metals, sodium sulfite, ammonia, volatile amines, and other such chemicals. These chemicals are used with little regard to their interactions with each other, to their accumulation within the system, or to their contribution to the problem of scale and sludge formation. Even with excessive use of prior formulations, corrosion, scale, leaks, microbial growth, and overall system inefficiency continue to be major problems in heating, ventilation, and air conditioning (HVAC) systems. These problems have resulted in total system failures causing portions of systems, and even entire systems to require replacement or major overhaul prior to the end of the otherwise expected life.

For the most part, prior formulations are not very compatible with the environment. They consist of concentrated acids that are used for cleaning systems. When a system is cleaned with such an acid, the wastewater has a very low pH, which can cause problems with municipal waste treatment plants. When spilled into a storm sewer or other path to a natural body of water, the low pH waste or raw chemical can have a disastrous effect on fish and other wildlife.

Prior formulations also utilize concentrated bases that maintain a high pH within a system and counteract the low pH that is present following an acid cleaning. The high pH material, like the low pH acids, can cause equally disastrous effects on waste treatment plants and the environment.

Prior formulations also utilize concentrated chemicals such as sodium sulfite, as taught in U.S. Pat. No. 4,279,768 (Busch), to remove oxygen from treated water. These chemicals function by reacting with the oxygen to form new compounds. If these concentrated chemicals find their way into a body of water, they create an extremely high chemical oxygen demand in the water, which can lead to the suffocation of fish and other aquatic life. Another problem with sodium sulfite use is that when it removes oxygen from water, the sulfite is converted to sulfate. As more oxygen enters the water, more sodium sulfite is added. What has been found in some boilers is a concentrated sludge that is induced by continuous addition of such chemicals. This sludge not only creates problems within the system, but also becomes a contaminant to the environment when not properly disposed of.

Generally, these prior formulations do not provide any means of healing, or otherwise protecting, surface areas that have suffered corrosion or have a compromised natural protective surface. Prior art formulations do claim to utilize surface protective chemicals. The generally accepted chemical for protecting copper-based surfaces and related metallic surfaces is benzotriazole. Benzotriazole actually prevents tarnishing or oxidation on non-ferrous metal surfaces. While this makes the surfaces look bright and shiny by stripping off the oxidation layer, it is the oxidation layer that is the metal's natural means of protection against corrosion.

Therefore, a need exists for a coolant treatment formulation that is safe and non-toxic to use, that does not require constant replenishment, that causes no, or low, impact to the environment, that does not adversely affect the operation of waste treatment facilities, that works with the metal's natural protective coatings to heal compromised areas and prevent corrosion, and that instead of causing adverse reactions when combined, causes either no reaction or synergistic reactions that benefit the function, safety, and environmental compatibility of the coolant.

BRIEF SUMMARY OF THE INVENTION

In accordance with one embodiment of the invention, a treatment composition is provided that includes an adsorbent that is constituted to adsorb contaminants from water and to expedite the removal of the contaminants from the water by physical means. Ideally, the composition includes one or more of a sequestration agent, a chelation agent, a dispersant, a peptization agent, a deflocculant, an emulsifier, and a buffering agent. The formulation may also include an abrasive, a surfactant, a disinfectant, and an agent to enhance visualization of the formulation to detect leaks in the system.

In accordance with another aspect of the foregoing embodiment of the invention, the composition or formulation can exist in a solid, dissolving form, or it may exist in a liquid form.

In accordance with another embodiment of the invention, a treatment composition is provided that includes a mixture of sequestration agents and chelation agents. Ideally, the sequestration agents and chelation agents also provide a dispersant to hold particulate matter in suspension, a peptization agent to liquefy contaminants, and a deflocculant to cause non-liquid contaminants to become able to flow. It may also include an emulsificant to disburse liquid contaminants, a buffering agent to control the pH of water, and an abrasive agent to aid in removal of contaminants from surfaces in the system.

In accordance with another aspect of the foregoing embodiment, the composition includes a surfactant to reduce surface tension, a disinfectant to reduce the amount of viable live contaminants, and a visualization agent to enable the visual detection of leaks in the system.

The disclosed embodiments of the invention are further directed to a treatment composition that, in one embodiment, comprises an adsorbent that is configured to adsorb contaminants from water and to expedite the removal of the contaminants from the water by physical means, such as a mechanical device.

In accordance with another aspect of the foregoing embodiment, the treatment composition can include a sequestration component to reduce the reaction of contaminants, a chelation agent to reduce the reaction of contaminants, a dispersant to hold particulate matter in suspension, a peptization agent to liquefy the contaminants, a defloccu-late to cause non-liquid contaminants to become able to flow, an emulsifier to disperse liquid contaminants, and a buffering agent to control the pH of the water.

In accordance with another aspect of the foregoing embodiment, an abrasive can be added to aid in the removal of contaminants from surfaces. Optionally, a surfactant can also be used to reduce surface tension.

In accordance with a further aspect of the foregoing embodiment, a disinfectant can be added to reduce the amount of viable live contaminants.

In accordance with still yet another aspect of the foregoing embodiment, a visualization agent can be added to enable the visual detection of leaks from a system utilizing the composition.

In accordance with yet a further aspect of the invention, the composition can be in the form of a particulate, flowing form or in a solid, dissolving form, or in a liquid form.

In accordance with another embodiment of the invention, a chemical formulation for treating coolant deficiencies, such as corrosion, scale, and low thermal transfer, as well as treating the water composition, is provided, the formulation including an adsorbent, an emulsifier, a buffering agent, a dispersant, a deflocculate, a chelation agent, and a peptizing agent, each of which are chosen for a specific task and for the characteristics of having little or no impact on the environment, and for being either a food-type additive approved for use on food preparation surfaces or otherwise generally recognized as safe.

In accordance with another aspect of the foregoing embodiment, the individual ingredients, beside having their own specific task, are configured, when compounded with each other in the formulation or those elements found in the system being treated, to provide synergistic effects.

In accordance with another embodiment of the invention, a coolant system is provided that utilizes water as the heat transfer agent, the coolant system comprising a chemical formulation for adding to the water to treat deficiencies in the water, such a corrosion, scale, and low thermal transfer, the formulation comprising an adsorbent, an emulsifier, a buffering agent, a dispersant, a deflocculate, a chelation agent, and a peptizing agent chosen for a specific task and for the characteristics of having little or no impact on the environment.

In accordance with another aspect of this embodiment of the invention, the constituents are chosen to also be a food-type additive or approved for use on food preparation surfaces or generally recognized as safe for human consumption. Ideally, all the constituents, beside having their own specific task, are chosen so that when compounded with each other in the formulation or those elements found in the system being treated, also provide synergistic effects.

As will be readily appreciated from the foregoing, the coolant treatment formulation Is safe, environmentally compatible, and provides an effective means of cleaning and treating systems such as HVAC and boiler type systems as well as pipe-based systems for transportation of water and water based fluids. Ideally, the formulation will work in conjunction with a metal's natural protective surfaces to allow the healing of corroded or otherwise compromised areas of the metal's surfaces, that will work in conjunction with metal's natural protective surfaces to produce a protective surface that is more durable than the natural protective surface alone, and that will aid In stopping corrosion before it starts. The formulation is constituted to remove scale that is present on wetted surfaces, to condition the raw water that is utilized in a coolant or other working fluid so as to render the resultant mixture less conducive to precipitation of scale forming contaminants, to allow a portion of the spent coolant treatment formulation, along with entrapped, entrained, sequestered, or chelated contaminants to be removed from the system via filtration means, and to reduce the volume of chemical utilized to treat and maintain a system, thus reducing costs, manpower requirements, and the impact on waste treatment facilities and the environment.

BRIEF DESCRIPTION OF THE SEVERAL VIEWS OF THE DRAWINGS

The foregoing and other features and benefits of the invention will be more readily appreciated as the same become better understood from the following description when taken in conjunction with the accompanying drawings, wherein:

FIG. 1 is a table setting forth an 8.20 pH buffering formulation; and

FIG. 2 is a preferred embodiment of active ingredients for HVAC systems.

DETAILED DESCRIPTION OF THE INVENTION

The disclosed embodiments of the invention provide a treatment formulation that is, among other things, optimized for the treatment of water and the system in which the water is used or transported. Such systems could, among others, consist of HVAC systems, piping for potable and non-potable water, heat exchange systems such as those used in industrial and commercial processes and in heating and cooling applications for use in systems such as internal combustion engines.

Each of the ingredients in the treatment formulation is chosen for its ability to perform a specific task or tasks, for its ability to synergistically react with another ingredient within the treatment formulation or with some component of the system being treated, for its minimal or no impact on the environment, and for being safe to use, handle, transport, and store. It is to be understood that while the treatment formulation is suitable for use in almost any type of system where water derived scale, corrosion, or other factors can be a problem, the formulation of the present invention will be described as it applies to an HVAC system.

The functions that the treatment formulation performs include removing already existing scale from the system's wetted surfaces; repairing and improving the metallic wetted components' natural protective oxide layers; physically removing, or rendering nonfunctional the contaminants within the water utilized or worked upon by the system, which precipitate out to form scale on wetted surfaces; buffering the pH of the water so as to provide the optimum level of base and acid conditions for promoting scale free and corrosion free metallic wetted surfaces; and eliminating and preventing re-growth of microbial contaminants, and as a carrier for a leak detecting dye.

To understand how the treatment formulation performs these functions, each function along with its related ingredients will be described in more detail below.

The first function that takes place as soon as the formulation enters the system's water is that the mineral contaminants within the water are adsorbed, sequestered, or chelated. As would be expected, this is accomplished through the use of an adsorbent, such as a Zeolite that is tailored for adsorbing the scale-forming minerals, and through sequestering and chelating agents, such as sodium tripolyphosphate (STPP), potassium tripolyphosphate, sodium citrate, potassium citrate, citric acid, tetrasodium ethylene diamine tetracetic acid (EDTA) and sodium nitrilotriacetate (NTA), that again are selected for their ability to sequester and chelate the scale-forming minerals. It should be noted that the ingredients performing the needed functions are not limited to those listed above. While the adsorbed minerals can be physically removed from the water through a filtration step that effectively captures and subsequently physically removes the non-dissolved adsorbent along with the adsorbed minerals, the sequestered and chelated minerals remain in the water, but are effectively prevented from affecting the saturation level of the minerals in the water, substantially preventing their precipitation, and creating a condition in the water which makes the water, in essence, deprived of the minerals that in turn makes the water an aggressive solvent for non-dissolved minerals or scale.

Removing existing scale is enhanced by the second function, which is wetting the scaled surface with a suitable surfactant. With the scale surfaces wetted, the mineral solvating water becomes aggressive towards the scale itself, effectively re-dissolving it back into the water. As the scale is re-dissolved, the minerals are sequestered, chelated, or adsorbed by the respective agents.

Even though scale can lead to corrosion, scale can also prevent corrosion by effectively sealing off the metallic surfaces from the water and its corrosive contaminants. Therefore, when the scale is removed from a wetted surface, the surface can actually be more prone to corrosion. The formulation addresses this problem through its function as an enhancer of the metal's natural protective oxide layer. This function can be accomplished through silica, and other mineral rich ingredients and poly and orthophosphates. For instance, the silica has the ability to combine with the natural protective oxide layer on the wetted metallic surfaces, and actually become an integral part of an enhanced composite protective layer that is less permeable, more durable, and more resistant to erosion than the original oxide layer. The enhanced layer is micro-thin and will not noticeably contribute to the thermal resistance of the water to metal interface. While the silica works with both ferrous and non-ferrous metals, it works best with the non-ferrous. The polyphosphates, on the other hand, tend to work best with ferrous metals. The polyphosphates function as cationic corrosion inhibitors for ferrous metals. As the polyphosphates age, they tend to revert to orthophosphates. Orthophosphates function as anodic corrosion inhibitors for ferrous metals, combining with the ferrous oxide natural protective film to seal cracks and voids in the film, and thus effectively sealing the water off from the base metal. In "once-through systems" where the water does not circulate but flows in and then out to waste after one pass through the system, and in other systems as well, a mixture of poly and orthophosphates, or all orthophosphates may be utilized.

Even though a system has the scale removed from it and has the scale forming contaminants removed or bound up, and has a corrosion resistant protective layer formed on the metal, it is still best to maintain the pH; of the water at that pH which is optimum for the system. While there are as many opinions as to what the proper pH should be as there are points on the pH scale, it would probably be most accepted that the proper pH for an HVAC system should be somewhere around the range of 7 to 9. The treatment formulation, when compounded with the percentages (by weight) shown in the 8.20 pH Buffering Formation Table of FIG. 1, tends to buffer the water at around a pH of 8.2. For pH levels other than 8.2, the ratios of the ingredients may be adjusted, or additional ingredients may be added or substituted. For instance, adding citric acid will result in a lowering of the buffering pH, while increasing the silicate level will raise the buffering pH.

In systems that have been in operation for some time, especially those that have utilized a chemical program that promotes precipitation of contaminants or those that have consumed excessive amounts of chemicals without purging spent chemicals, there will tend to be a collection of sludge in the lower portions of the system. If the system is shut down for any extended length of time, such as a heating system during the summer or a cooling system during the winter, the sludge can become quite packed and almost solid. While some of the sludge may be loosened by the flow of the system, potential exists for some of the sludge to become substantially permanent. The silicates, polyphosphates, and surfactants utilized in the formulation have inherent abilities to deflocculate, peptize, and disperse contaminants that may have formed the precipitates and sludge. This allows the contaminants in the sludge to be filtered out as they flow through the system filtration components.

It is a common misconception that if water, which is called potable and which has a residual of chlorine in it, is used in a closed loop system, that microbial growth will not be a problem. The fact is that chlorine has a relatively short life, especially if there are other things that it can oxidize. All that has to remain viable is one spore, or one bacteria or virus, and even in a system totally void of oxygen the entire system can become infested. In the treatment formulation, the preferred surfactant is of the quaternary, microbiocide, low foaming type surfactant, which is approved for use in food preparation areas and is suitable for control of mold, fungus, bacteria, virus, and algae.

The preferred embodiment of the treatment formulation for use in HVAC systems, and when added to the water of the HVAC system, is as shown in the Preferred Embodiment for HVAC Systems Table of FIG. 2. The treatment formulation is such that it can be formulated as either a dry form, such as powder, granular, or solid; or it can be a liquid, gel or paste. Table 2 shows the ratio of weight of ingredients to the total volume of water to be treated in the system (expressed in milligrams of each ingredient per liter of water to be treated). In this case, all of the constituents are dry, but the same would apply to liquid form.

The treatment formulation as described herein may be modified, with either none, more, or less of one or more of the ingredients, such as no adsorbent, or with additional active or inactive ingredients, such as an indicator dye to aid in leak detection. An abrasive compound to gently abrade scale or other contaminants that are adhered to surfaces may be used for applications where there is a need to reduce or eliminate scale from either metallic or non-metallic surfaces, and to protect the surfaces from corrosive attack.

While the principles of the invention have now been made clear in the illustrated embodiments, there will be obvious to one skilled in the art, modifications of structure, arrangements, proportions, the elements, materials and components used in the practice of the invention and otherwise, which are particularly adapted for specific environments and operational requirements without departing from the scope of the invention as set forth in the appended claims and the equivalents thereof.

The invention claimed is:

1. A coolant treatment formulation, comprising by weight: 3.8 percent $SiO_2$ $Na_2O$, 11.6 percent EDTA, 36.3 percent Type Na-A Zeolite, 1.4 percent $Na_5P_3O_{10}$, and 46.9 percent $C_6H_5Na_3O_7$.

2. A coolant treatment formulation for an HVAC system, comprising by ratio of weight per liter of water to be treated in the system:
   40 mg per liter of $SiO_2$ (as 57.2% $SiO_2$ and 23.8% $Na_2O$);
   171 mg per liter of EDTA (as 81% $Na_4EDTA$);
   6.25 mg per liter of P (as $Na_5P_3O_{10}$);
   865 mg per liter of Citrate (as $C_6H_5Na_3O_7$); and
   26.7 mg per liter of Didecyl Dimethyl Ammonium Chloride (80%).

3. The formulation of claim 2, further comprising a leak-indicating dye.

4. A coolant treatment formulation for an HVAC system, comprising by ratio of weight per liter of water to be treated in the system:
- 40mg per liter of $SiO_2$ (as 57.2% $SiO_2$ and 23.8% $Na_2O$);
- 171 mg per liter of EDTA (as 81% $Na_4EDTA$);
- 660 mg per liter of Zeolite (type Na-A);
- 6.25 mg per liter of P (as $Na_5P_3O_{10}$);
- 865 mg per liter of Citrate (as $C_6H_5Na_3O_7$); and
- 26.7 mg per liter of Didecyl Dimethyl Ammonium Chloride (80%).

5. A coolant treatment formulation to remove scale that is present on wetted surfaces and to condition the raw water that is utilized in a coolant or other working fluid so as to render the resultant mixture less conducive to precipitation of scale forming contaminants, comprising:
   a. a sequestration agent,
   b. a chelation agent,
   c. a buffering agent,
   d. a dispersant agent,
   e. a peptization agent,
   f. a deflocculation agent,
   g. an emulsifier,
   h. an abrasive,
   i. an adsorbent, and
   j. a surfactant comprising didecyl dimethyl ammonium chloride.

6. The formulation in claim 5 wherein said formulation comprises:
   a. $C_6H_5Na_3O_7$,
   b. $Na_5P_3O_{10}$,
   c. Type Na-A zeolite.
   d. EDTA, and
   e. $SiO_2$ $Na_2O$.

7. The formulation in claim 5 wherein said formulation is in a liquid form.

8. The formulation in claim 5 wherein said formulation is in a solid form.

9. The formulation in claim 5 wherein said formulation is in a powder form.

10. The formulation in claim 5 wherein said formulation is in a granular form.

11. The formulation in claim 5 wherein said formulation includes a surfactant.

12. The formulation in claim 5 wherein said formulation includes a microbiocide.

13. The formulation in claim 5 wherein said formulation includes a leak-indicating dye.

14. The formulation in claim 5 wherein said formulation is composed of food grade ingredients.

15. The formulation in claim 5 wherein said formulation is composed of ingredients that will buffer the coolant in the pH range of 7 to 9.

16. The formulation in claim 5 wherein the adsorbent and abrasive are provided by inclusion of zeolite.

17. The formulation in claim 5 wherein the formulation comprises sodium tripolyphosphate.

18. The formulation in claim 5 wherein the formulation comprises powdered sodium silicate.

19. The formulation in claim 5 wherein the formulation comprises EDTA.

20. The formulation in claim 5 wherein the formulation comprises sodium citrate.

21. A coolant treatment formulation to remove scale that is present on wetted surfaces, to condition the raw water that is utilized in a coolant or other working fluid so as to render the resultant mixture less conducive to precipitation of scale forming contaminants, comprising:
   a. a sequestration agent,
   b. a chelation agent,
   c. a buffering agent,
   d. a dispersant agent,
   e. a peptization agent,
   f. a deflocculation agent,
   g. an emulsifier,
   h. an abrasive,
   i. an adsorbent,
   wherein the formulation is composed of around 3.8% sodium silicate, 11.6% EDTA, 36.3% zeolite, 1.4% Sodium Tripolyphosphate, and 46.9% Sodium Citrate.

22. A formulation, comprising:
   a. $C_6H_5Na_3O_7$,
   b. $Na_5P_3O_{10}$,
   c. Type Na-A zeolite.
   d. EDTA,
   e. $SiO_2$ $Na_2O$, and
   f. a surfactant comprising didecyl dimethyl ammonium chloride.

23. The formulation in claim 22 wherein said formulation is in a liquid form.

24. The formulation in claim 22 wherein said formulation is in a solid form.

25. The formulation in claim 22 wherein said formulation is in a powder form.

26. The formulation in claim 22 wherein said formulation is in a granular form.

27. The formulation in claim 22 wherein said formulation includes a surfactant.

28. The formulation in claim 22 wherein said formulation includes a microbiocide.

29. The formulation in claim 22 wherein said formulation includes a leak-indicating dye.

30. The formulation in claim 22 wherein said formulation is composed of food grade ingredients.

31. The formulation in claim 22 wherein said formulation is composed of ingredients that will buffer the coolant in the pH range of 7 to 9.

* * * * *